United States Patent [19]
Pitoni et al.

[11] Patent Number: 4,726,274
[45] Date of Patent: Feb. 23, 1988

[54] MITERING DEVICE

[76] Inventors: Beniamino Pitoni, 35 Elmcrest Road, Toronto, Ontario, Canada, M9C 3R1; Paul Spicker, 77 Eringate Drive, Etobicoke, Ontario, Canada, M9C 3Z4

[21] Appl. No.: 817,626

[22] Filed: Jan. 10, 1986

[51] Int. Cl.[4] .................. B27B 17/02; B27B 27/08
[52] U.S. Cl. ........................... 83/745; 83/574; 83/798; 83/799
[58] Field of Search ............. 83/745, 574, 794, 798, 83/698, 799, 743, 796; 30/381–383, 386, 371

[56] References Cited

U.S. PATENT DOCUMENTS

| | | | |
|---|---|---|---|
| 1,535,042 | 4/1925 | Sadler | 83/745 |
| 2,463,860 | 3/1949 | Foster | 83/745 |
| 2,851,067 | 9/1958 | Greenslate | 83/796 |
| 3,965,788 | 6/1976 | Granberg | 83/745 |
| 4,070,757 | 1/1978 | Granberg et al. | 83/745 X |
| 4,146,962 | 4/1979 | Grube | 83/574 X |
| 4,244,104 | 1/1981 | Grube | 83/794 X |
| 4,283,980 | 8/1981 | Jackson | 83/798 |
| 4,611,521 | 9/1986 | McCardle | 83/796 |

*Primary Examiner*—E. R. Kazenske
*Assistant Examiner*—Hien H. Phan
*Attorney, Agent, or Firm*—Eugene J. A. Gierczak

[57] ABSTRACT

A device for anchoring a chain saw machine to a workpiece to produce selected mitered cuts through the workpiece, the device including; a base member presenting clamping structure at one end thereof for clamping the base to to workpiece; and structure rotatable about a first and second axis presented at the other end, the rotatable structure including structure for releasably securing the chain saw machine thereto for selective rotation of the chain saw machine about the first axis for selecting the degree of mitered cut to said workpiece, and for rotation of the chain saw machine about the second axis for transversally cutting through the workpiece at the selected degree of mitered cut.

8 Claims, 6 Drawing Figures

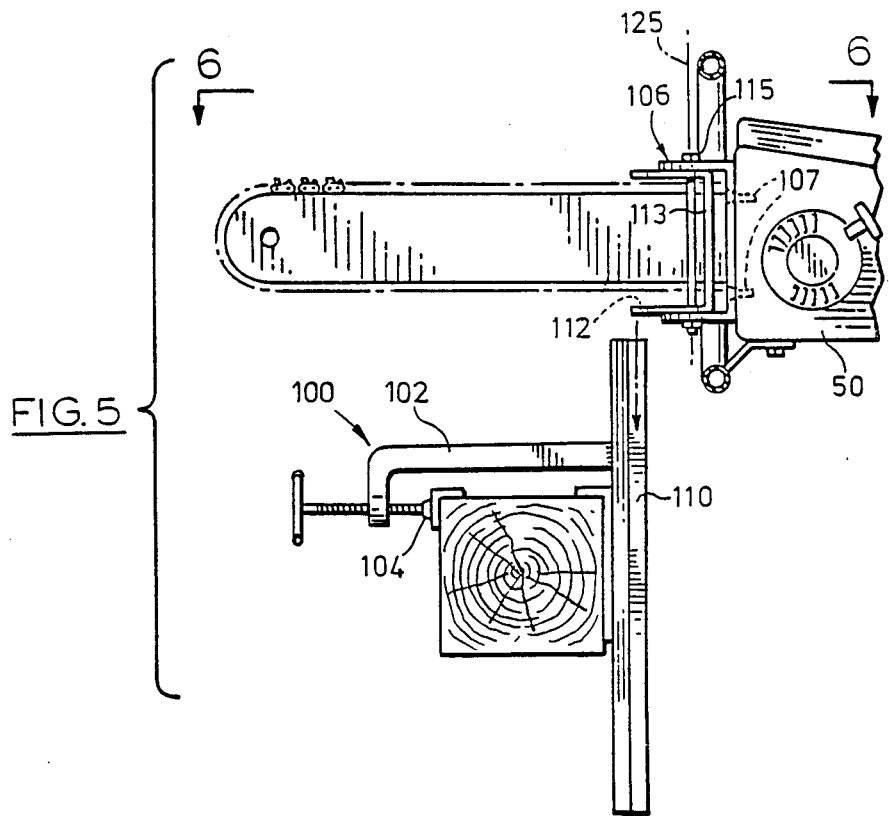
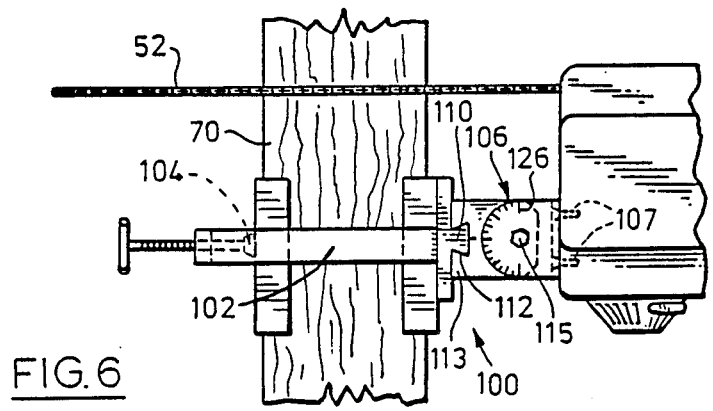

MITERING DEVICE

FIELD OF INVENTION

This invention relates to devices for attachment to a chain saw machine, and particularly to a device for anchoring a chain saw machine to a workpiece to produce selected mitered cuts through the workpiece.

BACKGROUND TO THE INVENTION

Chain saw machines are commonly used to cut workpieces such as timber, logs, or lumber such as 6"×6"or 8"×8"for example which are extensively used in landscaping work and heavy timber construction. Due to the bulkiness of the chain saw machine and the vibrational forces developed during the cutting of the kerf it is difficult to accurately cut the ends of the workpiece, particularly when cutting the ends of the workpiece at an angle which is to be joined to another workpiece cut at an angle so as to produce a mitered joint.

Various devices and methods have heretofore been proposed to accurately cut workpieces.

U.S. Pat. No. 4,127,046 discloses a portable chain saw which includes a mounting plate by which the chain saw can be quickly and easily mounted in a cradle frame forming a part of a stationary holding structure utilized in conjunction with a chain saw, when the saw is to be employed for precision cutting and various types of stationary on non-field usage. The stationary structure includes a cradle frame pedestal which pivotally supports the cradle frame for pivotation about a horizontal axis, and a pivotally supported turntable on which the cradle frame pedestal is mounted and which facilitates pivotal movement of the cradle frame and saw about a vertical axis.

Furthermore, the teachings of U.S. Pat. No. 3,385,330 relate to an improved mitering type of band saw which can be used to cut through workpieces of various sizes at substantially any preselected angle.

Moreover, U.S. Pat. No. 3,154,120 teaches an attachment which may be readily mounted on a chain saw by means of which the chain saw may be positively disposed and held, while in operation, at a definite angle to the longitudinal edge of the work being sawed assuming that the work is being cut transversally of its length.

U.S. Pat. No. 2,463,860 relates generally to a device to be variably anchored in a log for supporting a power saw machanism in a variety of cutting positions.

Finally, U.S. Pat. No. 1,855,945 shows a miter gauge for attachment to timber which includes a saw guide for receiving a saw.

Such devices present generally complicated structures or are difficult to use in association with a chain saw machine.

It is an object of this invention to produce a device for attachment to a chain saw machine which is simple to construct and use. The device is light and can be operated in the field.

It is a further object of this invention to produce accurate cuts through a workpiece when utilizing the device in association with a chain saw machine.

GENERAL DESCRIPTION OF THE INVENTION

This invention relates to a device for anchoring a chain saw machine to a workpiece to produce selected mitered cuts through the workpiece. The device includes a base member presenting a clamping structure at one end thereof for clamping the base to the workpiece, and structure rotatable about a first and second axis which is presented at the other end of the base, with the rotatable structure including structure to releasably secure the chain saw machine to the rotatable structure for selective rotation of the chain saw machine about the first axis for selecting the degree of mitered cut through the workpiece and for rotation of the chain saw machine about the second axis for transversally cutting through the workpiece at the selected degree of mitered cut.

In accordance with another aspect of this invention there is provided a device for anchoring a chain saw machine equipped with a cutter bar, to a workpiece to provide selected mitered cuts by the cutter bar through the workpiece, where the device includes; a base; clamping structure presented at the other end of the base for clamping same to the workpiece; a support structure presented at the other end of the base and extending generally perpendicularly outwardly from the base and said workpiece, and rotatably secured to the base for rotation about an axis perpendicular to the base and the workpiece; the support structure including in the region remote from the base a shaft mounted for rotation about an axis generally parallel to the base; the shaft including a threaded portion in the region remote from the clamping structure and adapted to tbe received by an aperture presented by the cutter bar; a first member carried by the shaft for bearing against one side of the cutter bar, and a second member for bearing against the other side of the cutter bar; and a threaded nut for engagment with the threaded portion of the shaft for drawing the members together so as to secure the chain saw machine to this shaft for selective rotation of said chain saw machine about the perpendicular axis for selecting the degree of mitered cut through the workpiece and for rotating the chain saw machine about the shaft for transversally cutting through the workpiece at the selected degree of mitered cut.

A further aspect of this invention relates to a kit comprising of the device as described and a cutter bar presenting an aperture.

Yet another aspect of this invention resides in the combination of the chain saw machine for cutting a workpiece, where the chain saw machine includes a cutter bar presenting an aperture therethrough; and a device for attachment to the cutter bar, which device includes; a base; a clamping structure presented at one end of the base for clamping same to the workpiece; a support structure presented at the other end of the base and extending generally perpendicularly outwardly from the base and the workpiece, and rotatably secured to the base for rotation about an axis perpendicular to the base and workpiece; the support structure including in the region remote from the base a shaft mounted for rotation about an axis generally parallel to the base, with said shaft being adapted to be received within the aperture of the cutter bar; and structure for releasably securing said cutter bar to the shaft for selective rotation of the chain saw about the perpendicular axis for selecting the degree of mitered cut through the workpiece, and for rotating the chain saw machine amout the shaft for transversally cutting through the workpiece at the selected degree of mitered cut.

Another aspect of this invention relates to a device for anchoring a chain saw machine to a workpiece to produce selected mitered cuts through the workpiece. The device includes a base member presenting a clamping structure for clamping the base to the workpiece, and structure rotatable about a first axis and slideable along a second axis, including means to releaseably secure the chain saw machine to said structure, said rotatable structure adapted for selective rotation of said chain saw machine about said first axis for selecting the degree of mitered cut to said workpiece, and said slideable structure adapted for slideable movement of said chain saw machine along said second axis for transversally cutting through said workpiece at said selected degree of mitered cut.

DESCRIPTION OF THE DRAWINGS

FIG. 5 is a side elevational view of a second embodiment of the device.

FIG. 6 is a top plan view of the device of FIG. 5.

DETAILED DESCRIPTION OF THE INVENTION

Identical parts have been given identical numbers throughout the figures.

Figure 1:
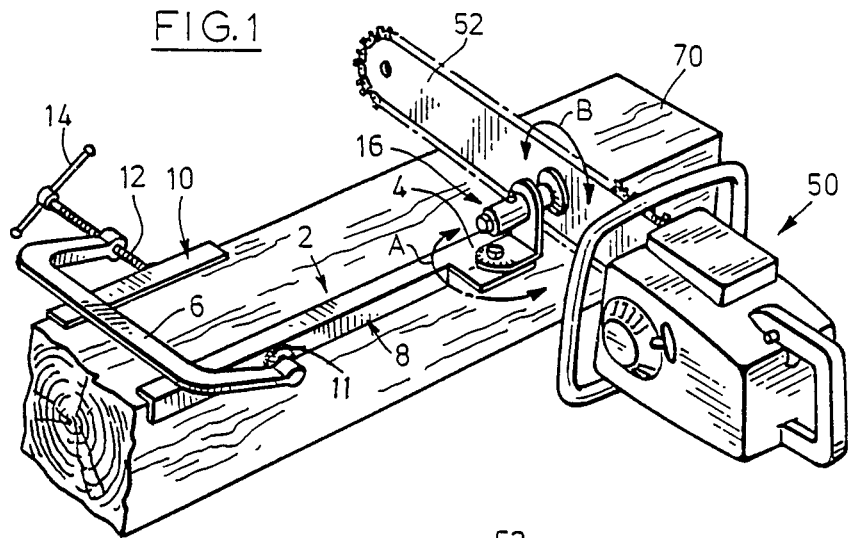
FIG. 1 is a perspective view of a first embodiment of the device for clamping a chain saw machine to a workpiece prior to a transversal cut.

FIG. 1 illustrates the device generally as 2 which is attachable to the chain saw machine generally illustrated as 50, all of which is releasably anchored to the workpiece 70 in a manner to be more fully described herein. The workpiece 70 is illustrated as a piece of 6"×6" or 8"×8" lumber but may consist of timber, logs or the like.

The device 2 generally comprises of the base 4 which has at one end thereof a clamping mechanism 6 for clamping the device 2 to the workpiece 70.

The clamping mechanism 6 comprises of clamping portions 8 and 10 which are adapted to embrace the workpiece 70. One end of clamping mechanism 6 is attached to clamping portion 8 by welding illustrated as 11 in FIG. 1, or other suitable means. The other end of clamping mechanism 6 is adapted to receive threaded portion 12 which presents a handle 14 at one end thereof. The other end of threaded portion 12 presents a pad 13 which is connected to the threaded portion by means of a ball joint 15. The pad 13 is welded to clamping portion 10. The device 2 is anchored to the workpiece 70 by turning the handle 14 so as to turn the threaded portion 12 and force the clamping portions 8 and 10 together and clamp the workpiece therebetween. The clamping portions 8 and 10 illustrated in FIG. 1 comprise of portions of angle irons which are clamped about the edges of the workpiece 70. However, it should be noted that the clamping portions 8 and 10 may be of a different configuration so as to embrace and clamp the device 2 to a round piece of timber or the like.

The other end of the base 4 presents a rotatable structure 16 which also includes a mechanism for releasably securing the chain saw machine 50 and particularly the cutter bar 52 thereto.

Figure 2:
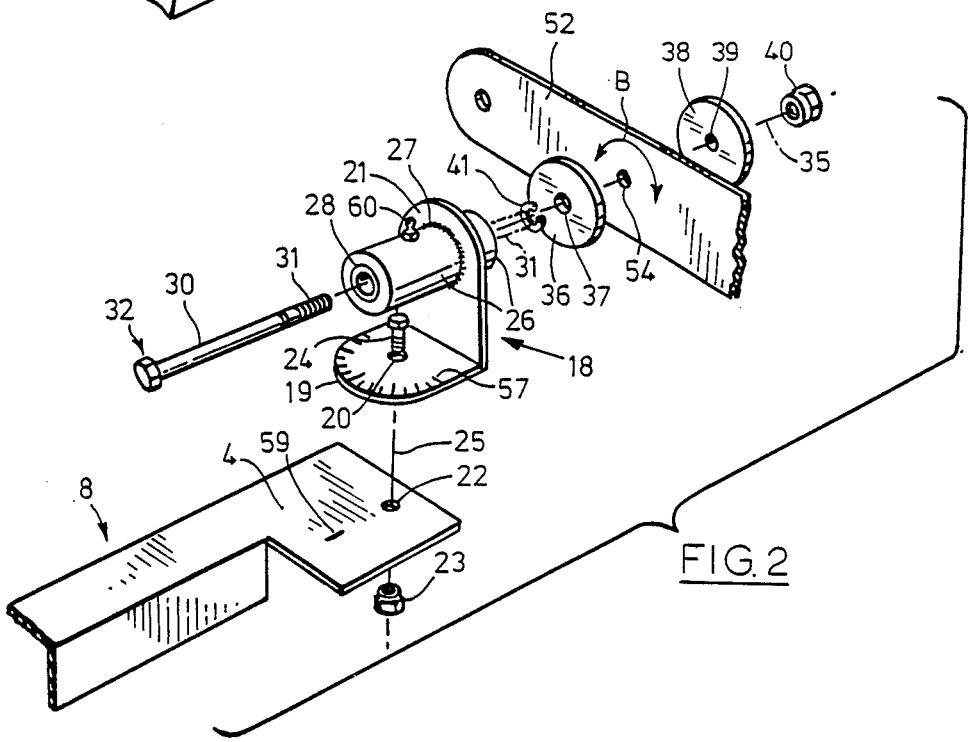
FIG. 2 is an exploded view of the device of FIG. 1 illustrating the mechanism for securing the cutter bar to the device.

FIG. 2 illustrates in greater detail the rotatable structure 16. The rotatable structure 16 includes a support member 18 which comprises of a piece of steel bent in the shape of a "L", consisting of a toe portion 19 and back portion 21.

The toe portion 19 includes a hole 20 which aligns with a hole 22 of base 4. The support member 18 is secured to base 4 for rotation, by means of a suitable fastener such as nut 23 and bolt 24 illustrated in FIG. 2. For greater particularity the support member 18 is secured to the base 4 for rotation about a first axis 25 which is generally perpendicular to the base 4 and the workpiece 70.

The support member 18 and particularly the back portion 21 extends generally perpendicularly outwardly from the base 4 and the workpiece 70. The support structure 18 includes in the region remote from the base 4 a cylindrical housing 26 which is fastened to the back portion 21 by welding 27 or other suitable means. The housing 26 includes a bushing 28 adapted to receive shaft 30 therethrough.

The shaft 30 may be presented by the bolt 32 illustrated in FIG. 2, which includes threaded portion 31. The shaft 30 is greater in length than the housing 26 so as to protrude therethrough and particularly for the threaded portion 31 to protrude through the housing 26 as illustrated by the phantom lines in FIG. 2.

The shaft 30 is adapted to rotate about a second axis 35 which is generally perpendicular to the first axis 25 and parallel to the base 4.

The shaft 30 carries a first disc member 36 which includes a hole 37 for receiving a portion of the shaft 30; the shaft 30 also carries a second disc member 38 which includes hole 39 for receiving a portion of the shaft 30.

The cutter bar 52 of chain saw 50 includes an aperture 54 which is adapted to receive a portion of the shaft 30.

The first disc member 36 is adapted to bear against one face of the cutter bar 52 and the second disc member 38 to bear against the other face of the cutter bar 52 when the nut 40 is threadedly fastened to the threaded portion of the shaft 31 in a manner so that the cutter bar 52 is clamped between said first and second disc members 36 and 38; and hence the chain saw machine 50 is releasably secured to the shaft 30 and the rotatable structure 16.

The shaft 30 is retained in housing 26 by means of a "C" clamp 41 or other suitable means so that the shaft 32 remains within housing 26 with the threaded portion 31 protruding therethrough.

In order to operate the device 2 the chain shaw machine 50 is attached to the shaft 30 by first placing the disc member 36 onto shaft 30 and then aligning the aperture 54 of cutter bar 52 onto the shaft 30. The second disc member 38 is then placed on the shaft 30. Then the nut 40 is threaded to the threaded portion 31 so that the cutter bar 52 is clamped between the disc members 36 and 38.

The device 2 is then clamped to the workpiece 70 by embracing the sides of the workpiece 70 between the clamping members 8 and 10. The handle 14 is then turned so that the device 2 is clamped to the workpiece 70. In this manner the chain saw machine 50 is releasably anchored to the workpiece 70 for cutting transversal cuts.

The operator of the device 2 may decide to clamp the device to the workpiece 70 and then releasably secure the chain saw machine 50 to the shaft 30 as described.

The toe portion 19 presents protractor markings 57 which cooperate with mark 59 on the base 2. It is also possible to present the protractor markings 57 on base 2 and the mark 59 on toe portion 19.

The desired degree of mitered cut may be selected by rotating the support member 18 about base 4 in the direction marked by arrow A. In order to rotate the chain saw machine 50 about axis 25 the cutter bar 52 is positioned above the workpiece 70 so as to clear same.

Once the degree of mitered cut is selected the chain saw 50 may be started and the cutter bar 52 rotated about axis 35 in a direction marked by arrow B so as to transversally cut through the workpiece 70.

Figure 3:
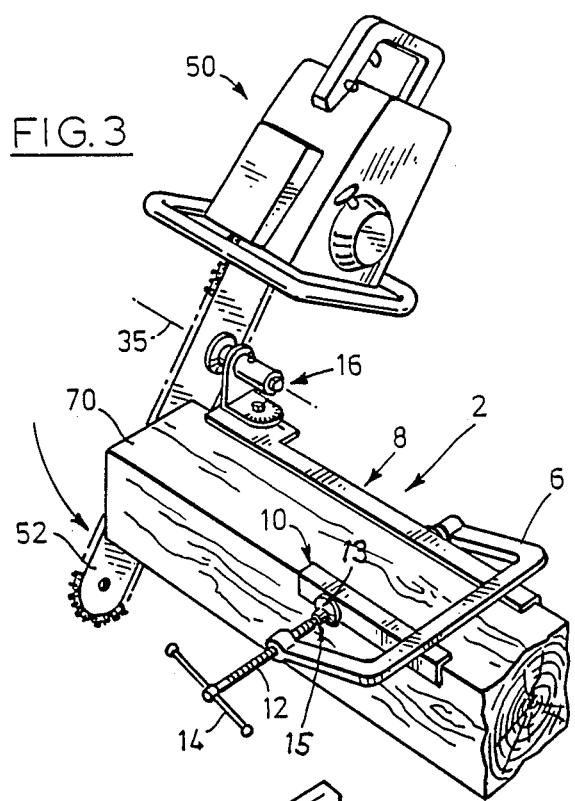
FIG. 3 is a perspective view of the first embodiment of the device attached to the chain saw mechanism after a transversal cut through the workpiece.

FIG. 3 shows the combination of the device 2 and the chain saw machine 50 once the cutter bar 52 has completely cut through the workpiece 70.

The degree of cut will depend on the length of the cutter bar 52 and the width of the lumber 70; however, the operator will be able to cut transversally through the workpiece 70 at any angle between generally 60° on either side of the line drawn between the width of the workpiece.

FIG. 3 shows the combination or the device 2 and chain saw machine 50 once the cutter bar 52 has completely cut through the workpiece 70.

FIG. 2 also shows a grease nipple 60 which is presented by the housing 26 for greasing the shaft 30.

Figure 4:
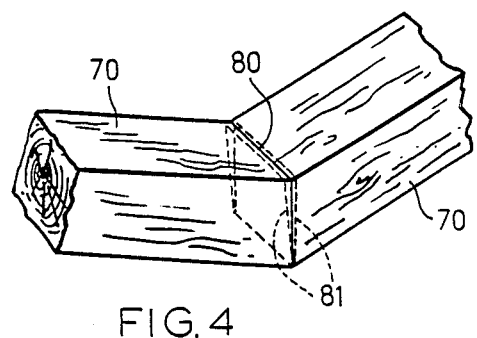
FIG. 4 is a perspective view illustrating the mitered cuts which are accomplished by utilizing the device.

FIG. 4 illustrates the accurate cuts 80 which are accomplished by utilizing the device 2 disclosed herewith. By utilizing the device 2 in combination with the chain saw machine 50 in the manner described herein, the chain saw machine 50 is securely anchored to the workpiece so as to minimize the wandering of the cutter bar 52 created by the vibrational forces, so as to travel through the kerf of the lumber 70 and thereby present a clean, accurate cut.

By utilizing the chain saw machine 50 without the device 2 it is more likely to produce irregular and non-matching mitered cuts 81 as illustrated by the hidden lines in FIG. 4.

FIGS. 5 and 6 illustrate a second embodiment of the invention wherein the rotational movement of the chain saw about an axis of the device for transversally cutting through the workpiece of the first embodiment has been replaced by a sliding movement for transversally cutting through the workpiece.

More particularly FIGS. 5 and 6 illustrate a device 100 having a base 102 which presents a clamping mechanism 104 for clamping the device 100 to the workpiece 70. The other end of the device includes a rotatable structure 106 which is releaseably connected to the chain saw machine 50 by bolts 107 or other suitable means. The rotatable structure includes an inner bracket 113 and pivot bolt 115. The rotatable structure is slidingly connected to the other end of the device by a dovetail assembly. The dovetail assembly comprises a key or guide 110 having a wedge shaped cross section as best seen in FIG. 6 which is adapted to be slidingly retained within a key way or channel 112. The chain saw machine 50 and rotatable structure 106 is adapted to slide along the key 110. The rotatable structure is adapted to rotate about a first axis 125 for selecting the degree of mitered cut. The rotatable structure is provided with protractor markings 126 to facilitate the selection of mitered cut. Furthermore once the degree of mitered cut is selected the chain saw machine 50 and rotatable structure is adapted to slide along the key 110 along a second axis presented by said key 110 so as to transversally cut through said workpiece.

The length of the key 110 in the region adjacent the base 102 is dimensioned so as to accommodate both key ways 112 of inner bracket 113 prior to commencement of cutting through the workpiece 70. The other end of key 110 may be dimensioned so as to extend beyond the workpiece 70 as illustrated in FIG. 5, or terminate a short distance from the workpiece 70, provided that in each case the key 110 remains in registration with both key ways 112 of inner bracket 113 when the chain saw has completed its cut through the workpiece, it should be noted that the device illustrated in FIG. 5 has been designed to accommodate workpieces of various sizes.

Although the preferred embodiment as well as the operation and use have been specifically described in relation to the drawings, it should be understood that variations in the preferred embodiment could easily be achieved by a man skilled in the art without departing from the spirit of the invention. Accordingly, the invention should not be understood to be limited to the exact form revealed by the drawings.

The embodiments of the invention in which an exclusive property or privilege is claimed or defined is as follows:

1. A device for anchoring a chain saw machine equipped with a cutter bar to a work piece to produce selected mitered cuts by said cutter bar through said work piece, said device including:
   (a) a base;
   (b) clamping means presented at one end of said base for clamping said clamping means to said work piece;
   (c) a support structure presented at another end of said base and extending generally perpendicularly outwardly from said base and said workpiece, said support structure rotatably secured to said base for rotation about a first axis generally perpendicular to said base and said work piece;
   (d) said support structure including in the region remote from said base a housing adapted to receive a rotatable shaft mounted for rotation about a second axis generally parallel to said base;
   (e) said rotatable shaft including a threaded portion in the region remote from said clamping means and adapted to be received by an aperture presented by said cutter bar;
   (f) a first member carried by said rotatable shaft for bearing against one side of said cutter bar, and a second member for bearing against said other side of said cutter bar;
   (g) a threaded nut for engagement with the threaded portion of said rotatable shaft for drawing said members together so as to releasably fixedly secure said cutter bar and said chain saw machine to said rotatable shaft for rotation about said second axis;
   for selective rotation of said chain saw machine about said first perpendicular axis for selecting the degree of mitered cut through said work piece, and for rotating said chain saw machine about said second axis of said rotatable shaft for transversally cutting through said work piece at said selected degree of mitered cut.

2. A device as claimed in claim 1 wherein a protractor is presented by either of said support structure or said base for selecting the degree of mitered cut.

3. A device as claimed in claim 1 wherein said support structure is presented to one side of said cutter bar and said threaded portion projects outwardly from said support structure in the region remote from said clamping means and adapted to be received by said aperture presented by said cutter bar.

4. A device as claimed in claim 3 wherein said first and second axis lie in a common vertical plane.

5. A device as claimed in claim 1 wherein said first and second axis are disposed perpendicularly to one another.

6. The combination of:
(a) a chain saw machine for cutting a work piece, said chain saw machine including a cutter bar presenting an aperture therethrough;
(b) a device for attachment to said cutter bar including:
   (i) a base;
   (ii) clamping means presented at one end of said base for clamping said clamping means to said work piece;
   (iii) a support structure presented at another end end of said base and extending generally perpendicularly outwardly from said base and said work piece and rotatably secured to said base for rotation about a first axis perpendicular to said base and said work piece;
   (iv) said support structure including in the region remote from said base a housing adapted to receive a rotatable shaft mounted for rotation about a second axis generally parallel to said base said shaft including a threaded portion in the region remote from said clamping means and adapted to be received within said aperture of said cutter bar with said support structure disposed to one side of said cutter bar;
(c) means for releasably securing said cutter bar to said shaft, said releasable securing means comprising:
   (i) a first disc member carried on said rotatable shaft and engagable with one side of said cutter bar;
   (ii) a second disc member carried on said rotatable shaft and engagable with the other side of said cutter bar;
   (iii) and a threaded member engagable with the threaded portion of said rotatable shaft for drawing said disc members together against the sides of said cutter bar to releasably fixedly secure said cutter bar and said chain saw machine to said rotatable shaft for rotation about said second axis;
for selective rotation of said cutter bar about said first perpendicular axis for selecting the degree of mitered cut through said work piece and for rotating said chain saw machine about said second axis of said rotatable shaft for transversally cutting through said work piece at said selected degree of mitered cut.

7. A portable device for anchoring a chain shaw machine to a work piece to produce selected mitered cuts through said work piece, said device including; a base; clamping means presented at one end of said base for clamping said base to said work piece against dislodgment during said mitered cuts; another end of said base presenting means rotatable about an axis and slidable along a direction substantially parallel to said axis; means to releasably secure said chain saw machine to said rotatable means; said rotatable means adapted for selected rotation of said chain saw machine about said axis for selecting the degree of mitered cut to said work piece and said slidable means adapted for slidable movement of said chain saw machine relative said base along said direction for transversally cutting through said work piece at said selected degree of mitered cut.

8. A device as claimed in claim 7 wherein said slideable means comprises a dovetail assembly.

* * * * *